Oct. 19, 1965     E. H. SHIVELY     3,213,363
H.F. MEASURING SYSTEM USING DIFFERENTIAL PROBE SIMULTANEOUSLY
RESPONSIVE TO MAGNETIC AND ELECTRIC FIELDS AT SELECTED POINT
Filed May 22, 1961
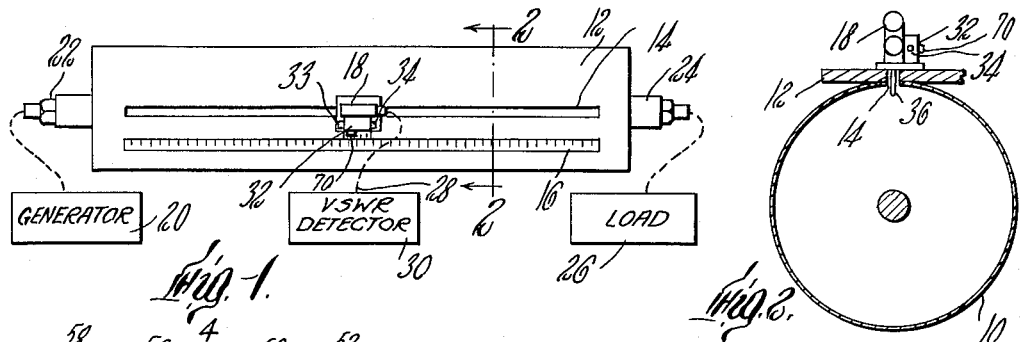
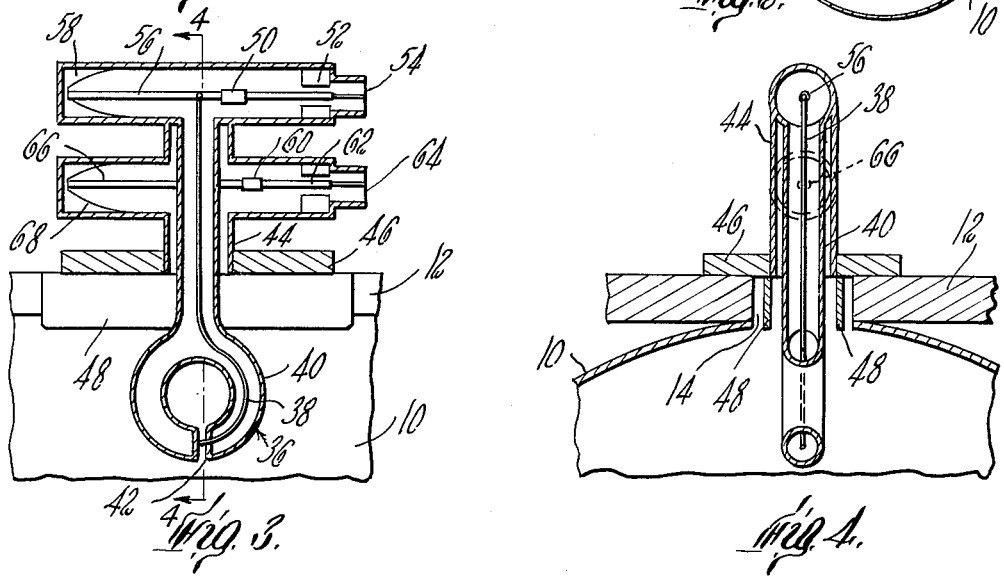
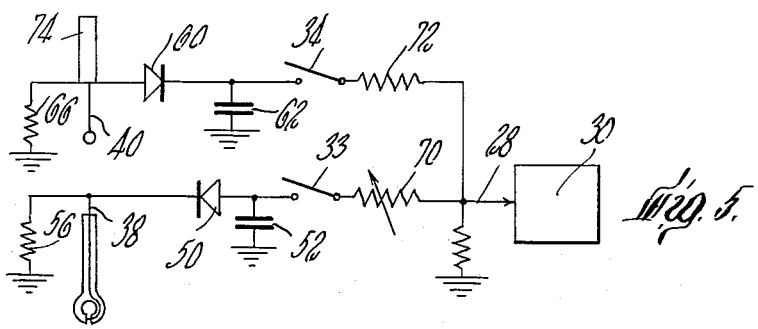
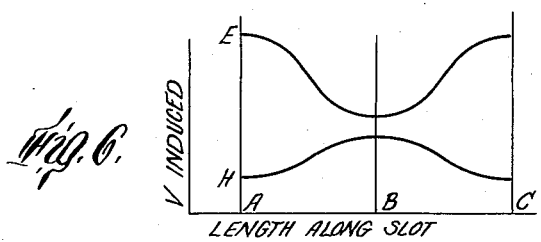
Inventor
Edward H. Shively United States Patent Office 3,213,363
Patented Oct. 19, 1965

3,213,363
H.F. MEASURING SYSTEM USING DIFFERENTIAL PROBE SIMULTANEOUSLY RESPONSIVE TO MAGNETIC AND ELECTRIC FIELDS AT SELECTED POINT
Edward H. Shively, Raymond, Maine, assignor to Dielectric Products Engineering Co., Inc., Raymond, Maine, a corporation of Maine
Filed May 22, 1961, Ser. No. 111,628
6 Claims. (Cl. 324—95)

This invention relates to electrical indicating and measuring instruments and more particularly to improved apparatus for the detection and measurement on high frequency wave energy in electrical systems.

It is frequently desirable to detect or measure high frequency wave signals or signal energy on transmission lines such as wave guides, coaxial lines or open wire lines. In those measurements the slotted line technique is often used wherein a probe extends through the slot into the interior of the transmission line and senses the electric field strength as it is moved to different positions along the line. The probe is connected to a suitable meter or other instrument which indicates variations in the strength of the sensed field (standing waves). In such apparatus it is desirable both that the slot be accurately machined in the transmission line section so that the field disturbance is minimum and that the probe arrangement be precisely positioned so that the probe member extends into the transmission line a distance that does not vary as it is moved along the slot. However small perturbations are unavoidable and that fact makes it difficult to sense or measure very small standing wave ratios as those perturbations often cause variations in the output signals that look like standing waves and render the actual standing waves of small magnitude difficult to identify.

Accordingly, it is an object of the invention to provide a novel and improved instrument for use in the detection and measurement of high frequency wave signals and energy on transmission lines.

Another object of the invention is to provide a novel and improved instrument that is capable of measuring extremely small standing wave ratios.

A further object of the invention is to provide a novel and improved instrument for measuring standing wave ratios which enables an effective multiplication of the scale reading of standard indicating instrument so that very small standing wave ratios may be easily read with such equipment.

Another object of the invention is to provide a novel differential probe arrangement capable of simultaneously sensing both the electric field and the magnetic field in high frequency electrical energy transmission systems.

In accordance with principles of the invention there is provided in conjunction with a high frequency electrical system which includes a generator, a load and a transmission line connected between the generator and the load, a transmission line section which is adapted to receive a sensing assembly that comprises a probe arrangement that is movable along the transmission line section with its position being accurately determinable. The probe arrangement extends into the area adjacent the wave transmission line section and includes a component responsive to the electric field at a point within the system and a second component responsive to the magnetic field at the same point in the system. The energy signals coupled from the system by the two components are combined by the sensing assembly in a manner to eliminate similar variations and the resultant signal is applied to suitable indicating means such as a VSWR meter to provide an indication of the standing wave ratio and related information of the system under examination.

The detecting and measuring system operates on the principle that electric (E) field standing waves produced in the system vary in space opposition to magnetic (H) field standing waves. That is, where the E field is strongest the H field is weakest and vice versa. The two fields vary with the same relationship however and by sampling both fields and taking the difference of the sensed values for example, the effect of these influences which affect both the E field sampling and the H field sampling in the same sense, such as variations caused by physical arrangement of the slotted line for example, are canceled. Due to the fact that the E field and H field vary in space opposition a difference signal also provides an amplified indication of the actual standing wave ratio and permits more sensitive measurements to be made. In addition, by appropriate circuit adjustments in calibration operations the output indication may be a direct and known function of the actual standing wave ratio, as for example, related by a factor of ten, so that extremely small standing wave ratios may be accurately read. Thus the invention provides an improved measuring instrument which enables accurate measurement of high frequency electrical energy in transmission systems. Other objects, features and advantages of the invention will be seen as the following description of a preferred embodiment thereof progresses in conjunction with the drawing, in which:

FIG. 1 is a plan view of a slotted transmission line section and sensing assembly embodying principles of the invention together with associated equipment indicated in block form;

FIG. 2 is a sectional view of the slotted transmission line section and the sensing assembly positioned thereon, taken along the line 2—2 of FIG. 1;

FIG. 3 is a sectional view through the probe arrangement of the sensing assembly;

FIG. 4 is another sectional view of the probe arrangement taken along the line 4—4 of FIG. 3;

FIG. 5 is a schematic diagram of the sensing system and associated circuitry; and FIG. 6 is a graph illustrating certain voltage relationships relative to the E and H fields sensed by the probe system at spaced points along the length of the slotted line section.

With reference to FIGS. 1 and 2 there is shown a slotted transmission line section 10 which is indicated as a coaxial line but may be wave guide or other forms of high frequency electrical energy transmission means. The section 10 has a flanged portion 12 mounted thereon in which is formed an accurately milled slot 14 that extends into and axially along the transmission line section. A scale 16 mounted on the flange 12 provides a reference for establishing various positions of the movable probe assembly 18 that is supported by the flange 12. The transmission line is supplied by a generator 20 and suitable associated equipment such as attenuators or other types of control and has a terminal portion 22 to which that equipment is connected. The opposite terminal 24 is connected to a suitable terminating section indicated generally as a load 26. The probe structure 18 mounted on the slotted line section is movable along that line as a unit and produces an output over line 28 to a suitable indicating means such as a VSWR meter 30. Control circuitry is also mounted on the movable probe unit and is indicated generally as the box 32 with switches 33, 34.

As indicated in greater detail in FIGS. 3 and 4, the probe assembly 18 includes a shielded loop structure 36 which includes a central conductor 38 and a surrounding shielding member 40 formed to provide an annulus at the lower end. The shield 40 has a gap 42 in the lower center thereof so that the inner conductor 38 is exposed. This shielded loop structure leads upwardly through a concentric surrounding tube 44 which is supported by the guide flanges 46 of the probe assembly 18. Positioned between the shielded loop and the walls of the slot 14 are elongated shielding flanges 48 which extend a short distance into the transmission line 10. The inner conductor 38 is connected to a detector assembly which includes a crystal 50, the output from which is applied through a coaxial feed through capacitor arrangement 52 to a suitable connector arrangement 54 which may be BNC for example. A 50-ohm Type N coaxial instrument load including a carbon film resistor 56 housed in a tapered jacket 58 is also connected to the inner conductor 38. The shielding member 40 is connected to a second crystal detector 60 and that output is taken through a similar feed through capacitor arrangement 62 to a suitable output terminal 64. A 50-ohm coaxial instrument load including resistor 66 housed in tapered jacket 68 is also utilized in conjunction with the crystal detector 60. Other detector arrangements such as bolometers may be utilized where suitable, of course.

A schematic diagram of the circuitry above described is shown in FIG. 5. The strength of the H field is sensed by the shielded loop 38 and the resulting signal is applied through the crystal 50, switch 33 and potentiometer 70, to the output terminal of the probe apparatus for application over line 28 to the VSWR meter 30. In similar manner the strength of the E field is sensed by the outer conductor 40 of the probe configuration and the resultant signal is applied through the crystal detector 60 which is connected in opposite relation to the detector 50 and fed through switch 34 and resistor 72 to the line 28 for application to the meter 30.

As the plane of the loop conductor 38 is parallel to the direction of energy transfer in the transmission line, the magnetic field produces in the conductor 38 a voltage across the gap 42 and the resulting current flow is applied to the detector 50. As the gap is located symmetrically with respect to the electric field any signal produced in the conductor 38 thereby is effectively canceled out and does not impair the accuracy of the magnetic field strength sensing. The induced voltage in the inner conductor is accurately proportional to the magnetic field strength where the diameter of a loop is less than 10% of the principal wave length of interest and in a preferred embodiment the loop diameter is ¼ inch, approximately 1% of the principal wavelength.

The E or electric field is sensed by means of the outer conductor 40 of the probe which functions as an antenna to extract a fraction of the power flowing in the line and apply a resulting signal to the detector 60. The additional length of the outer conductor 40 functions as a tuning stub, indicated schematically as 74 in FIG. 5. The probe projects into the electric field through the milled slot 14 in the transmission line section 10 and couples energy out of the line. As the probe is small and projects only a short distance into the slot (the effective length of protrusion of the probe being less than 10% of the principal wavelength) its effect on the field is minimal.

In operation of the system, the E and H fields vary generally as indicated in FIG. 6, the E field having a maximum at the point that the H field has a minimum and vice versa where standing waves are produced in the system. It will be noted that these fields vary in space opposition as indicated in FIG. 6 and by sensing the difference between the fields the magnitude of the standing wave indication may be magnified. In addition similar distortions in the output signals due, for example, to the shape of the slot or to slight variations in the length of the probe into the line as the probe is moved along the slot, which affect each signal equally, are canceled out by the subtraction process. By arranging the detectors 50, 60 so that the detected signals are of opposite polarity an effective subtraction results when the signals are combined for application to output line 28. Thus the apparatus senses both the magnetic and the electric fields at the same point in the transmission line, combines resultant signals in a differencing manner and produces an accurate output indication of standing wave information.

At a particular point A on the line, where the E field is strongest (1) $V_A = V_E - V_H = (K_1 E_A) - (K_2 H_A) = (K_1 E_A) - (K_2 E_B)$ At point B of minimum E field strength (2) $V_B = V_E - V_H = (K_1 E_B) - (K_2 H_B) = (K_1 E_B) - (K_2 E_A)$ (3) $V_A/V_B = (K_1 E_A) - (K_2 E_B)/(K_1 E_B) - (K_2 E_A)$ Defining: $E_A/E_B = \sigma$ (actual standing wave ratio) and $K_2/K_1 = A$.

For a linear detection system and linear SWR meter, $V_A/B_B = \phi$ (sensed voltage ratio).

(4) $\phi = K_1(\sigma - K_2)(K_1 - K_2\sigma) = \dfrac{\sigma - A}{1 - A\sigma}$ For a differential probe with square law detectors and an SWR meter designed for use with this type detector $$\phi = \sqrt{\dfrac{(K_1 E_A)^2 - (K_2 E_B)^2}{(K_1 E_B)^2 - (K_2 E_Z)^2}} = \sqrt{\dfrac{K^2\sigma^2 - K_2}{K_1^2 - K_2\sigma^2}} = \sqrt{\dfrac{\sigma^2 - A^2}{1 - A^2\sigma^2}}$$

$$A = \dfrac{\sigma^2 - \phi^2}{1 - \phi^2\sigma^2}$$

By appropriate adjustment of the attenuation constants $K_1$ and $K_2$ the sensed voltage ratio $\phi$ may bear a desired relation to the actual standing wave ratio. For example, if $\sigma = 1.02$ and $\phi = 1.2$ $$A = \sqrt{\dfrac{1.04 - 1.44}{1 - 1.44(1.04)}} = .894$$

The differential probe apparatus may be calibrated to provide output indications that bear a known and magnified relation to the actual standing wave ratio in the following manner.

Initially, the transmission system is tuned so that substantially no standing wave is detectable with the E field switch 34 closed so that an output signal is applied to the meter 30. The meter is then adjusted to full scale deflection. The switch 33 is then also closed to produce an output which indicates the difference between the E field and the H field, and without further adjusting the meter deflection, the potentiometer 70 is adjusted until the resultant indication on the meter is down a known amount. If this amount is for example, −7.1 db, the indicated SWR, $\phi$, is ten times greater than the actual SWR, $\sigma$. With the system calibrated as above described standing wave ratio measurements may be read directly on the meter dial with greatly increased accuracy. For example with this particular setting, if the meter should indicate a standing wave ratio of 1.1 the actual standing wave ratio would be 1.01. If the slope of the line be 1.01, it still reads 1.01, and there has thus been a tenfold increase in the ratio of indicated SWR to slope.

Thus by appropriate adjustment of the E and H field signal constants through appropriate attenuation the apparatus is capable of reading standing wave ratios to an expanded scale. It is often desirable to make the resistor 72 also adjustable so that the desired balancing of signal strength may be more easily attained. In addition constant variations or errors that are introduced in both the E field measurement and in the H field measurement are canceled by the arrangement of the invention thus providing additional sensitivity. The apparatus of the invention is a compact and extremely accurate device capable of measuring very small standing wave ratios and of providing relating information about high frequency wave transmission systems. It will be seen by those skilled in the art various modifications may be made in the disclosed embodiment without departing from the spirit and scope of the invention. Therefore while a preferred embodiment of the invention has been shown and described it is not intended that the invention be limited thereto or to details thereof and departures may be made therefrom within the spirit and scope of the invention as defined in the claims.

I claim:

1. Measuring apparatus for use with an elongated energy transmitting member, said energy transmitting member having a slot axially disposed in an outer wall thereof, comprising a probe assembly adapted to be moved along said slot including a probe member adapted to extend through said slot into said member, said probe member including a first sensor responsive to the magnetic field at a particular point in said energy transmitting member and a second sensor responsive to the electric field at the same point in said energy transmitting member, said first sensor comprising the inner conductor of a shielded loop and said second sensor comprising the outer conductor of said loop, a first detector coupled to said inner conductor to produce a signal of one polarity proportional to the energy of said magnetic field at said particular point and a second detector coupled to said second sensor to produce a signal of the opposite polarity proportional to the energy of said electric field at said particular point and circuitry to combine said signals to produce a resultant signal proportional to the difference between the electric field and the magnetic field at said particular point.

2. Apparatus to measure standing wave ratios in high frequency electrical energy transmission systems, said apparatus being adapted to be used in conjunction with an electrical energy transmitting line section, comprising a probe assembly adapted to be moved along the length of said section including a probe member adapted to extend into the area adjacent said section, said probe member including a shielded loop structure adapted to be disposed substantially perpendicular to the direction of energy transmission in said section and having at its end an annulus portion disposable parallel to the direction of energy transmission in said section, said annulus portion having a diameter less than ten percent of the wavelength of the signal of principal interest, said shielded loop structure comprising an outer tubular conductor adapted to sense the strength of the electric field at the position of the probe member, and an inner conductor adapted to sense the strength of the magnetic field at the position of said probe member, said outer tubular conductor having a gap therein to expose said inner conductor at its lowest point, a first detector coupled to said inner conductor to produce a first signal of one polarity proportional to the strength of said magnetic field and a second detector coupled to said outer tubular conductor to produce a second signal of the opposite polarity proportional to the strength of said electric field, circuitry to combine said first and second signals to produce a resultant signal proportional to the difference between the electric field and the magnetic field at said point and means to apply said resultant signal to indicating means for providing information relative to standing wave ratios in the associated electrical energy transmission system.

3. The apparatus as claimed in claim 2 wherein said detector means includes a crystal mounted in said probe assembly and connected between the associated conductor of said shielded loop and said combining circuitry.

4. The apparatus as claimed in claim 2 wherein the tubular outer conductor of said shielded loop extends above the point of coupling of said second detector to said shielded loop so that portion of said outer conductor functions as a tuning stub for the probe portion sensing the strength of said electric field.

5. The apparatus as claimed in claim 2 wherein said combining circuitry further includes means to selectively attenuate the signal proportional to the strength of at least one of said fields to adjust the relation of said resultant signal to the actual standing wave ratio.

6. Apparatus to measure standing wave ratios in high frequency electrical energy transmission systems, said apparatus being adapted to be used in conjunction with an elongated tubular energy transmitting member having an axially extending slot in an outer wall thereof, comprising a probe assembly adapted to be moved along said slot including a probe member adapted to extend through said slot into said member, said probe member including a shielded loop structure adapted to extend toward the center of said member substantially perpendicular to the direction of energy transmission in said member and having at its inner end an annulus portion disposed substantially parallel to the direction of energy transmission in said member, said shielded loop structure extending into said member a distance of less than ten percent of the wavelength of the signal of principal interest and said annulus having a diameter less than ten percent of the wavelength of the signal of principal interest, said shielded loop structure comprising an outer tubular conductor adapted to sense the strength of the electric field at the position of the probe member, and an inner conductor adapted to sense the strength of the magnetic field at the position of said probe member, said outer tubular conductor having a gap therein to expose said inner conductor at its lowest point, a first detector coupled to said inner conductor to produce a first signal of one polarity proportional to the strength of said magnetic field and a second detector coupled to said outer tubular conductor to produce a second signal of the opposite polarity proportional to the strength of said electrical field, circuitry to combine said first and second signals to produce a resultant signal proportional to the difference between the electric field and the magnetic field at said point and means to apply said resultant signal to indicating means for providing information relative to standing wave ratios in the associated electrical energy transmission system.

References Cited by the Examiner

UNITED STATES PATENTS

| | | | |
|---|---|---|---|
| 2,423,416 | 7/47 | Sontheimer | 333—10 |
| 2,496,837 | 2/50 | Woodyard | 324—95 |
| 2,606,974 | 8/52 | Wheeler | 333—10 |
| 2,611,861 | 9/52 | Heath | 324—58 |
| 2,636,082 | 4/53 | Saad | 333—10 |
| 2,680,837 | 6/54 | Sensiper | 324—58 |
| 2,724,800 | 11/55 | Hansen | 324—95 |
| 2,879,473 | 3/59 | Olerud | 324—95 |
| 3,145,338 | 8/64 | Downs | 324—58 |

FREDERICK M. STRADER, *Primary Examiner.*

BENNETT G. MILLER, WALTER L. CARLSON,
*Examiners.*